United States Patent [19]

Jones, Jr.

[11] Patent Number: 5,044,673

[45] Date of Patent: Sep. 3, 1991

[54] ROTARY CONNECTOR

[75] Inventor: William B. Jones, Jr., Whittier, Calif.

[73] Assignee: Dresser Industries, Inc., Dallas, Tex.

[21] Appl. No.: 465,443

[22] Filed: Jan. 16, 1990

[51] Int. Cl.$^5$ .............................................. F16L 39/04
[52] U.S. Cl. .................................... 285/134; 285/136;
285/190; 285/281
[58] Field of Search ............... 285/134, 136, 190, 281,
285/16, 133.1, 365, 61, 379, 276

[56] References Cited

U.S. PATENT DOCUMENTS

| | | | |
|---|---|---|---|
| 2,791,449 | 5/1957 | Monroe | 285/134 |
| 2,805,087 | 9/1957 | Shaw et al. | 285/134 |
| 3,449,839 | 6/1969 | Crist | 285/134 X |
| 3,684,316 | 8/1972 | Lavender | 285/190 X |
| 4,606,560 | 8/1986 | McCracken | 285/190 X |
| 4,635,969 | 1/1987 | Jackson | 285/190 X |
| 4,758,026 | 7/1988 | Timm | 285/134 |

Primary Examiner—Dennis L. Taylor
Assistant Examiner—Heather Chun
Attorney, Agent, or Firm—Ross, Howison, Clapp & Korn

[57] ABSTRACT

A rotary connector for selectively coupling a rotating pipe to a stationary pipe includes a housing for interconnection to the stationary pipe. A rotary stem is disposed within the housing for providing a fluid communication path between the rotating pipe and the stationary pipe. The rotary stem is selectively removable from the housing without removal of the housing from the stationary pipe. A seal is provided and is interconnected to the rotary stem and disposed between the rotary stem and the housing for sealing the rotary stem within the housing. The housing seal is selectively removable from the housing with the rotary stem. The rotary connector further includes a rotary flange for interconnection to the rotating pipe for selectively mounting the rotary stem to the rotating pipe for the transfer of torque to the rotary stem. The rotary stem can be selectively removed from the rotary flange without removal of the rotary flange from the rotating pipe. A sealing assembly is interconnected to the rotary stem and is disposed between the rotary stem and the rotary flange for sealing the rotary stem to the rotary flange. The sealing assembly is selectively removable from the rotary flange without removal of the rotary flange from the rotating pipe.

23 Claims, 4 Drawing Sheets

ROTARY CONNECTOR

TECHNICAL FIELD OF THE INVENTION

The present invention relates to rotary connectors, and more particularly to a rotary connector that provides for the replacement of stems, sealing assemblies, and bearings without the requirement of removal of inlet and outlet piping, or removal of the rotary connector from a base mounting plate.

BACKGROUND OF THE INVENTION

Rotary connectors are utilized for the selective coupling of fluid flow paths between a rotary pipe member and a stationary pipe members. A rotary connector functions to isolate two separate flow paths such as, for example, one flow path being between two pipes of a coaxial stem assembly with a second flow path defined through the middle of the coaxial stem assembly. Rotary connectors also function to translate rotational movement of a connected rotary pipe into a stationary piping system which may include an inlet and outlet port. Rotary connectors also act as bearings or pillow block supports that carry the load of the weight of the connected rotary pipe, since the connected rotary pipe truncates at the rotary connector. Typically, a rotary connector includes a housing to which stationary piping is attached and in which a coaxial stem is allowed to rotate.

Installation and maintenance problems involved with rotary connectors include the replacement of sealing devices and bearings disposed between the rotary coaxial stem assembly and nonrotating housing. Heretofore, it has been required that the stationary inlet and outlet piping be removed from the main housing and/or main housing removed from a base plate in order to perform maintenance on or replacement of sealing devices and bearings. Additionally, such maintenance has required that the coaxial stem assembly be disconnected from the connected rotary piping. This disconnect requirement has resulted in the use of various types of split sealing devices and packing material. These types of connections result in excess and undesirable leakage of the fluid flowing within the rotary connector. Maintenance problems are further complicated if the rotary connector is required to be disassembled from the rotary piping and stationary piping in that upon reinstallation, the entire system must be realigned on its base plate.

A need has thus risen for a rotary connector having improved maintenance and one which provides for a more efficient replacement of component parts in which the coaxial stem and associated sealing devices can be maintained or repaired through replacement of components without the requirement of removal of the rotary connector from stationary piping or the supporting base plate. Additionally, a need has risen for improved coupling devices between the coaxial stem assembly and the connected rotary piping to eliminate the need for complicated maintenance of split sealing devices and the need for packing thereby substantially minimizing external leakage of fluid from the rotary connector.

SUMMARY OF THE INVENTION

In accordance with the present invention, a rotary connector for selectively coupling a rotating pipe to a stationary pipe is provided. The rotary connector includes a housing for interconnection to the stationary pipe. A rotary stem is disposed within the housing for providing a fluid communication path between the rotating pipe and the stationary pipe. The rotary stem is selectively removable from the housing without removal of the housing from the stationary pipe. A seal is provided and is interconnected to the rotary stem and disposed between the rotary stem and the housing for sealing the rotary stem within the housing. The housing seal is selectively removable from the housing with the rotary stem.

In accordance with another aspect of the present invention, a rotary connector for selectively coupling a rotating pipe to a stationary pipe is provided. The rotary connector includes a rotary flange for interconnection to the rotating pipe for selectively mounting the rotary stem to the rotating pipe for the transfer of torque to the rotary stem. The rotary stem can be selectively removed from the rotary flange without removal of the rotary flange from the rotating pipe. A sealing assembly is interconnected to the rotary stem and is disposed between the rotary stem and the rotary flange for sealing the rotary stem to the rotary flange. The sealing assembly is selectively removable from the rotary flange without removal of the rotary flange from the rotating pipe.

In accordance with yet another aspect of the present invention, a rotary connector for selectively coupling a rotating pipe to a stationary inlet pipe and a stationary outlet pipe is provided. The rotary connector includes a housing having an outer case for interconnection to the stationary inlet pipe and the stationary outlet pipe. The housing further includes an inner case interconnected to the outer case and selectively removable from the outer case. An outer rotary stem is provided and is disposed within the housing inner case for providing a fluid communication path between the rotating pipe and the stationary outlet pipe. The outer rotary stem is selectively removable from the housing without removal of the housing from the stationary pipes. An inner rotary stem is provided, and is coaxially mounted to the outer rotary stem for rotation therewith, and for providing a fluid communication path between the rotating pipe and the stationary inlet pipe. The inner rotary stem is removable with the outer rotary stem from the inner case. A housing seal is further provided and is interconnected to the outer rotary stem and is disposed between the outer rotary stem and the outer case and is further disposed between the outer rotary stem and inner case for sealing the outer rotary stem within the housing. The housing seal is selectively removable from the housing and the outer rotary stem without removal of the outer case from the stationary pipes. A rotary flange is further provided in the present rotary connector for connection to the rotating pipe and for selectively mounting the outer rotary stem to the rotating pipe for transfer of torque to the outer rotary stem. The outer rotary stem can be selectively removed from the rotary flange without removal of the rotary flange from the rotating pipe. The rotating flange further includes a seal assembly interconnected to the outer rotary stem and which is disposed between the outer rotary stem and the rotary flange for sealing the outer rotary stem to the rotary flange. The flange seal is selectively removable from the rotary flange without removal of the rotary flange from the rotating pipe.

In accordance with yet another aspect of the present invention, a rotary connector for use with a rotating combustion unit, where the rotating combustion unit includes coaxially disposed inner and outer rotating pipes is provided.

The rotary connector selectively couples the rotary pipe to a stationary inlet pipe and a stationary outlet pipe. The rotary connector includes a housing having an outer case for interconnection to the stationary inlet pipe and the stationary outlet pipe. The housing further includes an inner case interconnected to the outer case and selectively removable from the outer case. An outer rotary stem is provided and is disposed within the housing inner case for providing a fluid communication path between the inner rotating pipe and the stationary outlet pipe. The outer rotary stem is selectively removable from the housing without removal of the housing from the stationary pipes. An inner rotary stem is provided, and is coaxially mounted to the outer rotary stem for rotation therewith, and being connected to the inner rotating pipe for providing a fluid communication path between the outer rotating pipe and the stationary inlet pipe. The inner rotary stem is removable with the outer rotary stem from the inner case. A housing seal is further provided and is interconnected to the outer rotary stem and is disposed between the outer rotary stem and the outer case and is further disposed between the outer rotary stem and inner case for sealing the outer rotary stem within the housing. The housing seal is selectively removable from the housing and the outer rotary stem without removal of the outer case from the stationary pipes. A rotary flange is further provided in the present rotary connector for connection to the rotating pipe and for selectively mounting the outer rotary stem to the rotating pipe for transfer of torque to the outer rotary stem. The outer rotary stem can be selectively removed from the rotary flange without removal of the rotary flange from the rotating pipe. The rotating flange further includes a seal assembly interconnected to the outer rotary stem and which is disposed between the outer rotary stem and the rotary flange for sealing the outer rotary stem to the rotary flange. The flange seal is selectively removable from the rotary flange without removal of the rotary flange from the rotating pipe.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
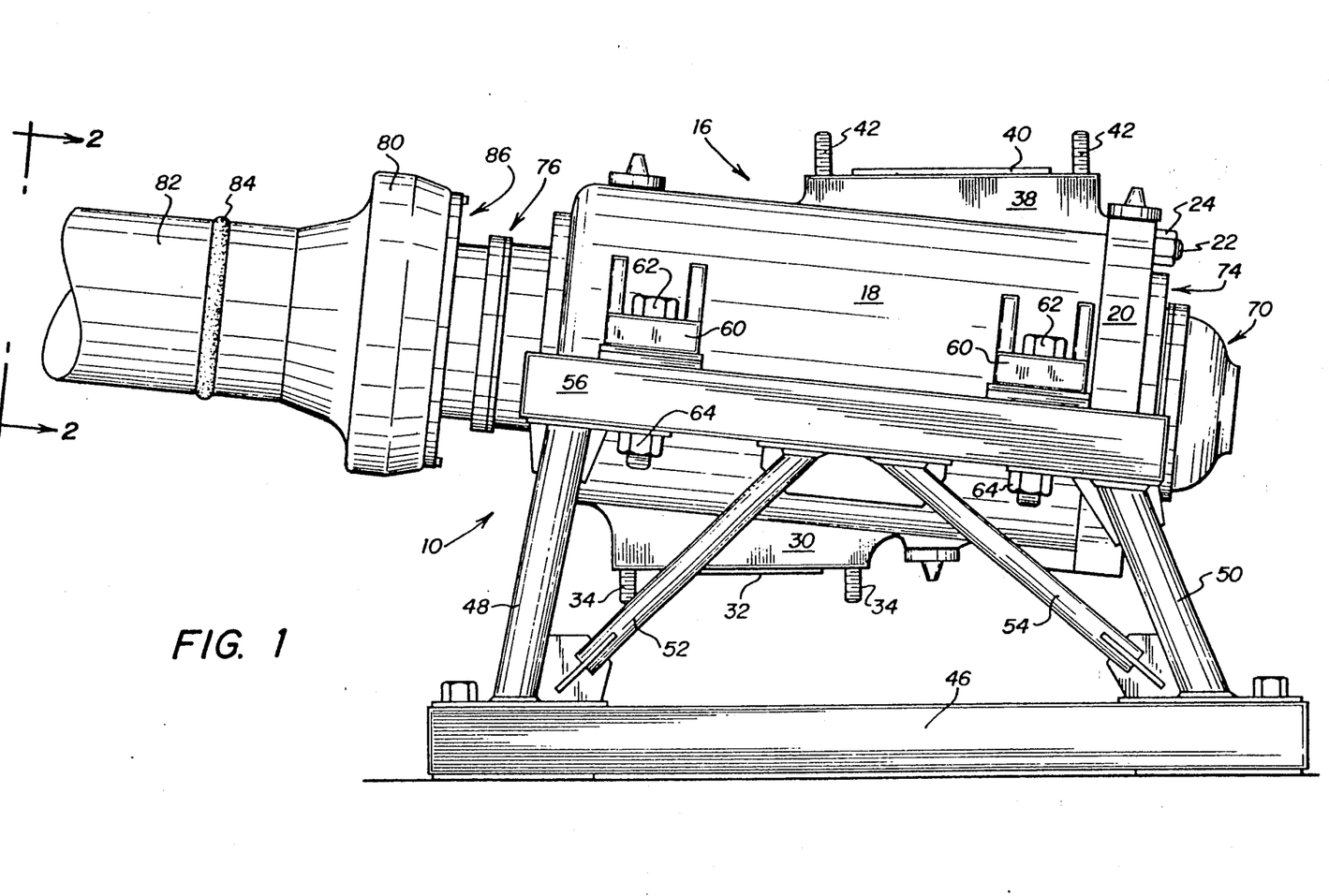
FIG. 1 is a side elevational view illustrating the present rotary connector mounted to a rotating pipe and supported on a base plate.
Figures 2, 5:
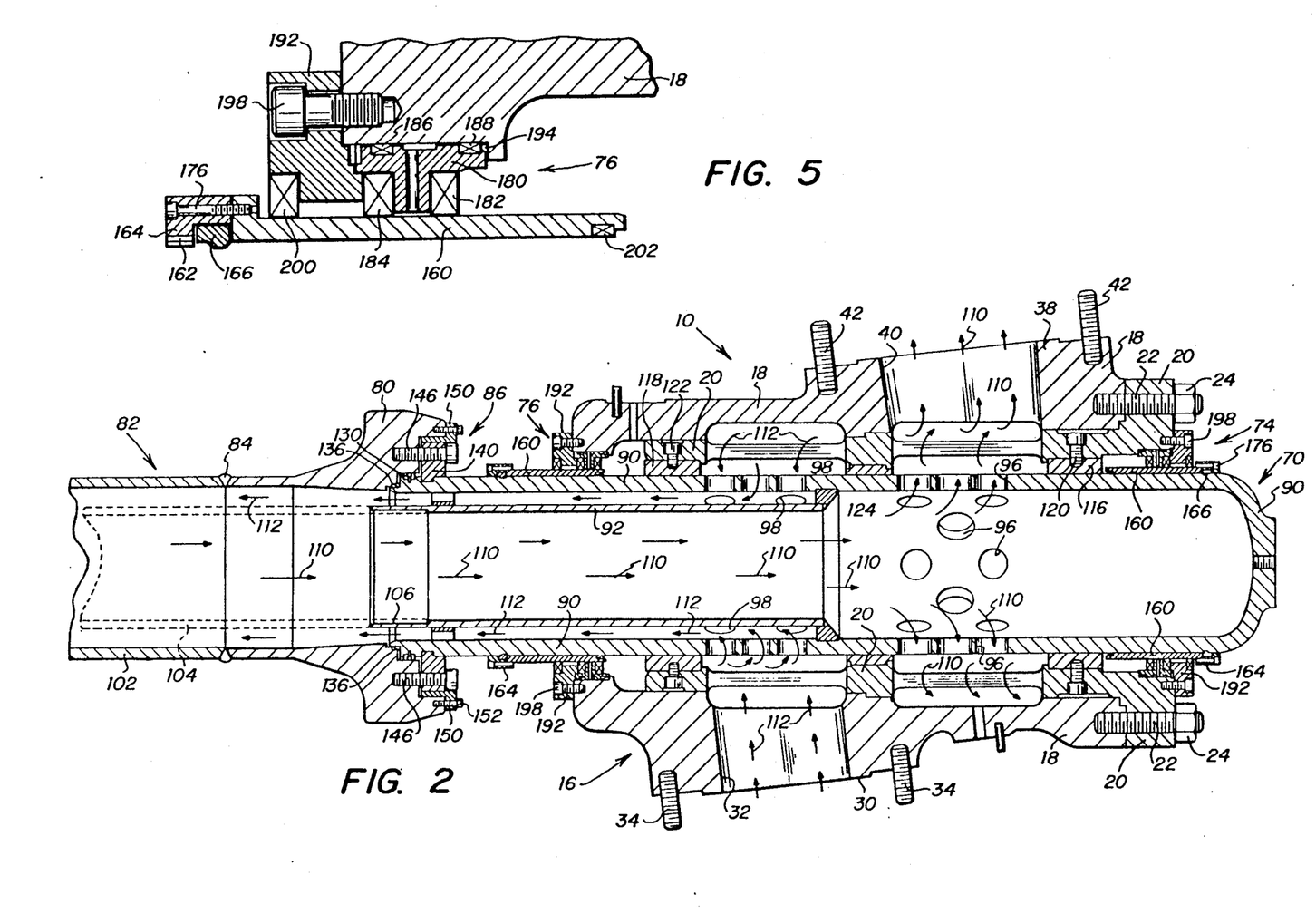
FIG. 2 is a sectional view of the present rotary connector taken generally along sectional lines 2—2 of FIG. 1 with the coaxial stem assembly fully inserted within the inner case within the rotary connector housing.
FIG. 5 is a enlarged detail of the outboard and inboard outer stem sealing assembly.

Referring simultaneously to FIGS. 1 and 2, the present rotary connector is illustrated and is generally identified by the numeral 10. Rotary connector 10 may be utilized in combination with a rotary combustion unit for conveying fluid to and from the rotary combustion unit. In such a system, rotary connector 10 segregates the fluid into two separate flow paths, allowing for differences in temperature and liquid/gas phases within the two flow paths. The use of rotary connector 10 in combination with a rotary combustion unit, is for illustrative purposes only, it being understood that the present rotary connector 10 can be utilized in numerous applications where it is desired to establish fluid communication paths between and among a rotating pipe and stationary piping.

Rotary connector 10 includes a housing, generally identified by the numeral 16. Housing 16 includes an outer case 18 and an inner case 20. Inner case 20 is selectively interconnected to outer case 18 utilizing a stud 22 and nut 24.

Outer case 18 includes an inlet flange 30 having an inlet port 32 which receives stationary piping (not shown). The stationary piping is interconnected to outer case 18 through studs 34. Outer case 18 further includes an outlet flange 38 which includes an outlet port 40 for interconnection to stationary piping (not shown). This stationary piping is interconnected to outlet port 40 through studs 42.

Housing 16 is rigidly mounted to a base plate 46 through supporting legs 48 and 50 and transverse support members 52 and 54. Legs 48 and 50 and support members 52 and 54 are interconnected to a support beam 56 which is interconnected to outer case 18 through the use of a pair of feet 60. Feet 60 are integrally formed in outer case 18 of housing 16 and are interconnected to support beam 56 utilizing bolts 62 and nuts 64. Feet 60 are disposed along the center line of housing 16 to thereby neutralize the thermal growth component in the vertical direction of rotary connector 10 thereby minimizing variations in the operation of rotary connector 10 between hot and cold alignment.

Disposed within housing 16 is a coaxial stem assembly, generally identified by the numeral 70 which is centrally disposed within inner case 20. Coaxial stem assembly 70 is sealed within housing 16 utilizing an outboard sealing assembly, generally identified by the numeral 74 and similarly configured inboard sealing assembly, generally identified by the numeral 76. Outboard sealing assembly 74 functions to seal between coaxial stem assembly 70 and inner case 20 whereas inboard sealing assembly 76 functions to seal between coaxial stem assembly 70 and outer case 18 of housing 16.

Coaxial stem assembly 70 is interconnected via a coupling flange 80 to the rotating pipe 82. Rotating pipe 82 may be interconnected to a rotating combustion unit or other source of fluid which is to be communicated through rotary connector 10 to stationary piping. Coupling flange 80 is permanently interconnected to rotating pipe 82 utilizing, for example a weld 84. Interconnected between coaxial stem assembly 70 and coupling flange 80 is a flange sealing assembly, generally identified by the numeral 86.

Referring now specifically to FIG. 2, coaxial stem assembly 70 includes an outer stem 90 and an coaxially disposed inner stem 92. Outer stem 90 includes a plurality of circumferentially disposed apertures 96 and 98. Rotating pipe 82 includes an outer pipe 102 and a coaxially disposed inner pipe 104. Inner pipe 104 frictionally engages inner stem 92 in the area identified by numeral 106. Rotary connector 10 through the use of coaxial stem assembly 70 thereby defines two isolated fluid flow paths. A first path indicated by arrows 110 flows from a rotary combustion unit via inner pipe 104 through inner stem 92, through apertures 96 and via port 40 to stationary piping. A second path indicated by arrows 112 originates from stationary piping connected to inlet port 32. The inlet fluid flows through apertures 98 within outer stem 90, through the area between outer stem 90 and inner stem 92 into the area between inner pipe 104 and outer pipe 102 to a rotary combustion unit or other unit interconnected to rotary connector 10. Rotating pipe 82 including outer and inner pipes 102 and 104, respectively, impart rotational motion to outer stem 90 and inner stem 92, respectively. Torsional motion is also imparted to coupling flange 80 through the rotation of rotating pipe 82. It therefore can be seen that coaxially stem assembly 70 rotates with rotating pipe 82 within housing 16 which remains stationary in operation of rotary connector 10. Outer case 18 as well as inner case 20 remain stationary and are interconnected to inlet and outlet stationary piping.

Figure 3:
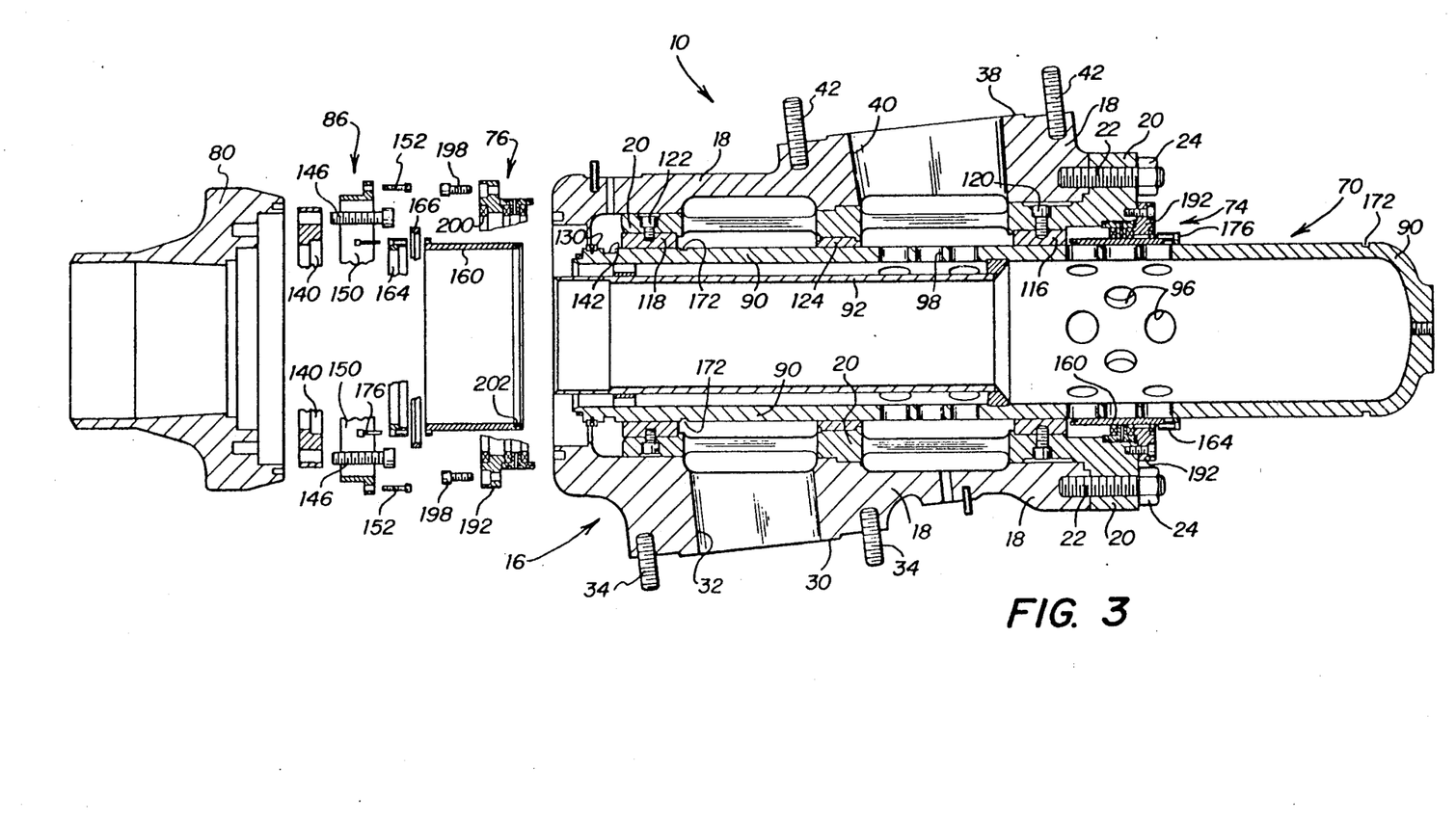
FIG. 3 is a sectional view of the present rotary connector taken generally along sectional lines 2—2 of FIG. 1, and partially exploded, illustrating the coaxial stem assembly partially removed from the inner case of the rotary connector housing with the coupling flange and coupling flange sealing assembly removed.
Figure 4:
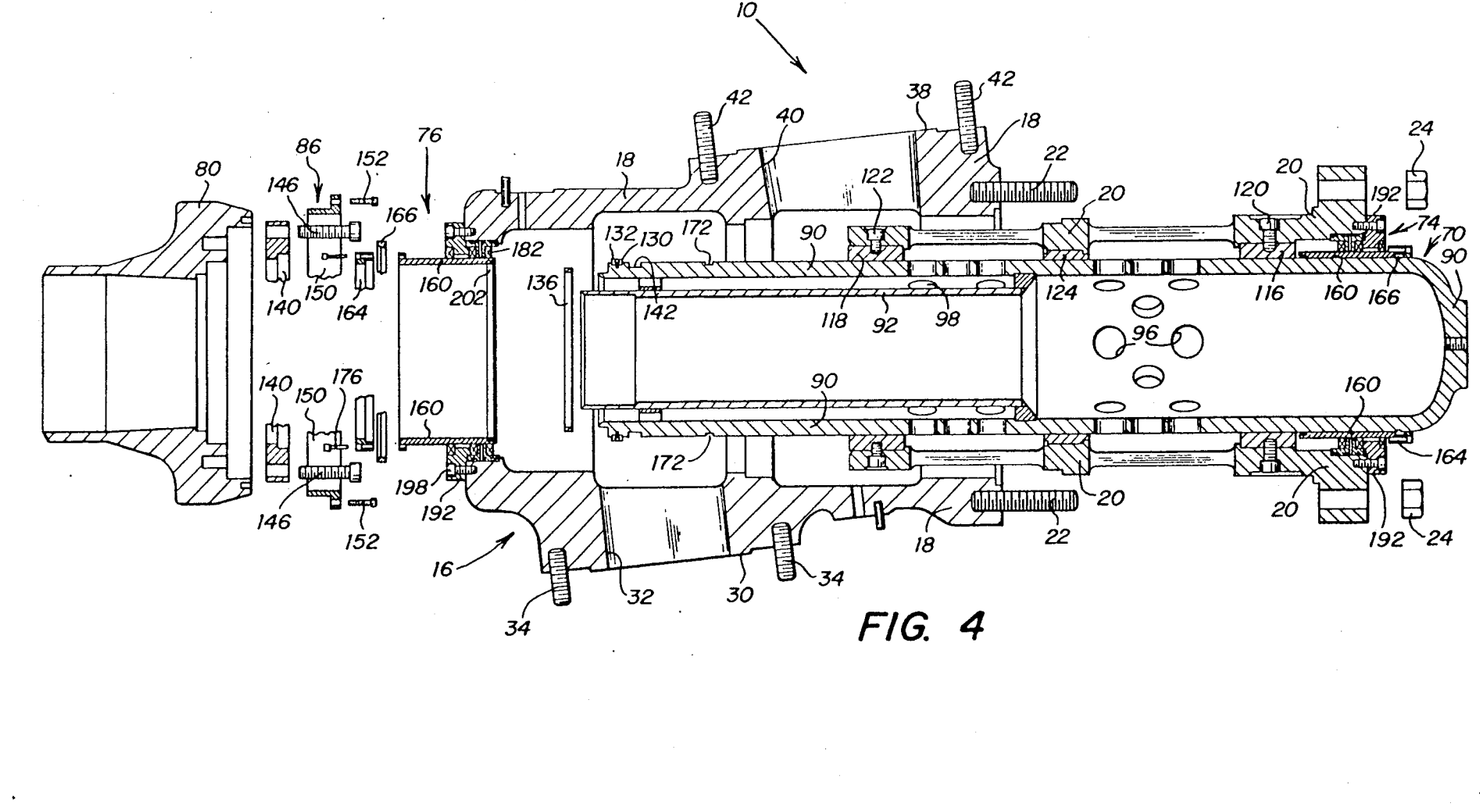
FIG. 4 is a sectional view of the present rotary connector taken generally along sectional lines 2—2 of FIG. 1, and partially exploded, illustrating the coaxial stem assembly and inner case partially removed from the outer case of the housing and the coupling flange and coupling flange sealing assembly removed.

Referring simultaneously to FIGS. 2, 3 and 4, an important aspect of the present rotary connector 10 is the ability to maintain and service coaxial stem assembly 70, outboard sealing assembly 74, inboard sealing assembly 76 and flange sealing assembly 86 without removal of the stationary piping interconnected to housing 16 and further without removal of housing 16 from its supporting structure and base plate 46. In this manner, rotary connector 10 can be maintained in place to make it possible for the replacement of sealing devices and associated bearings without disconnecting the inlet and outlet stationary piping from housing 16, thereby preserving the alignment between rotary connector 10 and the rotary combustion unit or other unit interconnected to rotary connector 10.

FIG. 2 illustrates coaxial stem assembly 70 in its operating position within housing 16 and interconnected through coupling flange 80 to rotating pipe 82. FIGS. 3 and 4 illustrate the disassembly of coupling flange 80 and flange sealing assembly 86 from coaxially stem assembly 70 to allow coaxial stem assembly 70 to be removed from housing 16. Specifically, FIG. 3 illustrates coaxial stem assembly 70 withdrawn from inner case 20, such that the various components of flange sealing assembly 86 may be serviced and repaired. FIG. 4 illustrates coaxial stem assembly 70 and inner case 20 withdrawn from outer case 18 of housing 16. In this manner, outboard sealing assembly 74 and inboard sealing assembly 76 can be serviced and repaired without any further disconnections within rotary connector 10. The disassembly of flange sealing assembly 86 and nut 24 from stud 22 allows for the separation of inner case 20 from outer case 18, as illustrated in FIG. 4. Although not illustrated in the drawings, the entire coaxial stem assembly 70 together with inner case 20 can be removed from housing 16 for complete servicing and repair of outer stem 90 and inner stem 92 of coaxial stem assembly 70; outboard sealing assembly 74 and its components; inboard sealing assembly 76 and its components; as well as bearings and bushings to be subsequently described.

Referring again to FIG. 2, positioned between outer stem 90 and inner case 20 are stationary bearings 116 and 118 which are interconnected to inner housing 20 utilizing cap screws 120 and 122, respectively. Also disposed between outer stem 90 and inner case 20 is a bushing 124 which controls leakage of fluid between ports 32 and 40 of housing 16.

Referring simultaneously to FIGS. 2, 3 and 4, flange sealing assembly 86 will now be described. Flange sealing assembly 86 provides a seal between coupling flange 80 and coaxial stem assembly 70 and also provides a transfer of rotational motion from rotating pipe 82 to coaxially stem assembly 70. A key 130 is interconnected to outer stem 90 utilizing a cap screw 132 (FIG. 4). Key 130 transmits rotational movement from coupling flange 80 to coaxial stem assembly 70. A seal ring 136 (FIG. 4) provides a seal between outer stem 90 and coupling flange 80 in order to seal fluid between the interconnection of coupling flange 80 and coaxial stem assembly 70. In order to retain coaxial stem assembly 70 within coupling flange 80 due to axial forces generated from internal pressure and to maintain coaxial stem assembly 70 coaxially disposed with respect with rotating pipe 82, a split ring 140 is utilized. Split ring 140 engages a groove 142 (FIGS. 3 and 4) within outer stem 90. Split ring 140 is fastened to coupling flange 80 utilizing a cap screw 146. A split ring tapered wedge 150 is then inserted between split ring 140 and coupling flange 80. Split ring tapered wedge 150 is interconnected to coupling flange 80 utilizing a cap screw 152. In summary, coupling flange 80 is easily removable from coaxial stem assembly 70. Flange sealing assembly 86 including seal ring 136, split ring 140, split ring tapered wedge 150 and associated cap screws 146 and 152 provide a seal between coupling flange 80 and coaxial stem assembly 70. Each of the components within the flange sealing assembly 86 can be easily removed for service and replacement. Further, coupling flange 80 functions to transmit torque from rotating pipe 82 to coaxial stem assembly 70 through the use of key 130.

Referring now to FIGS. 2, 3 and 5, outboard sealing assembly 74 and inboard sealing assembly 76 will now be described. Although FIG. 5, details inboard sealing assembly 76, it will be understood that outboard sealing assembly 74 is similarly configured, and like numerals will be utilized for like and corresponding components found in both outboard sealing assembly 74 and inboard sealing assembly 76.

Circumferentially disposed around outer stem 90 is a seal sleeve 160. Seal sleeve 160 is axially held in place utilizing a key 162 of a split ring retainer 164 which in turn maintains a split ring 166 in a groove 172 (FIGS. 3 and 4) in outer stem 90. Split ring retainer 164 is interconnected to seal sleeve 160 utilizing a cap screw 176. Seal sleeve 160 is retained against the internal pressure of rotary connector 10 by split ring 166. Key 162 and split ring retainer 164 function to prevent rotation of seal sleeve 160.

Inboard sealing assembly 76 further includes a seal carrier 180 which receive seals 182 and 184. Seal carrier 180 is installed into outer case 18 and is further sealed utilizing seals 186 and 188. In order to retain seal carrier 180 within outer case 18, a seal plate 192 urges seal carrier 180 against a shoulder 194 of outer case 18 of housing 16. Seal plate 192 is attached to outer case 18 utilizing a cap screw 198. Disposed between seal plate 192 and seal sleeve 160 is a seal 200 which functions as a dust wiper to remove any dirt or debris located on seal sleeve 160. Seal sleeve 160 further includes a seal 202 for preventing leakage of fluid from outer stem 90 flowing under seal sleeve 160. Although outboard sealing assembly 74 and inboard sealing assembly 76 have been described with respect to the components shown in FIG. 5, it will be understood that other sealing assemblies may be utilized with the present rotary connector 10 for sealing outer stem 90 and inner and outer cases 20 and 18, respectively. Since coaxial stem assembly 70 is removable from housing 16, any similar sealing assemblies to perform the functions of outboard sealing assembly 74 and inboard sealing assembly 76 can be easily serviced and components replaced utilizing the present invention.

It therefore can be seen that the present rotary connector greatly improves the ease of on-site maintenance and makes possible the replacement of sealing devices and bearings without disconnecting inlet and outlet piping from the rotary connector housing and without removing the rotary connector from its base plate. In so doing, alignment between the rotary connector and associated units such as, for example, a rotary combustion unit, need be performed only once on initial installation of the rotary connector. Further, the present rotary connector utilizing the described flange seal assembly allows the coaxial stem assembly to be disengaged from the coupling flange for easy maintenance and replacement of sealing components.

Whereas the present invention has been described with respect to specific embodiments thereof, it will be understood that the various changes and modifications will be suggested to one skilled in the art and it is intended to encompass such changes and modifications as fall within the scope of the appended claims.

I claim:

1. A rotary connector for selectively coupling a rotating pipe to first and second stationary pipes comprising:
   a housing including an outer case having an inlet port for interconnection to the first stationary pipe and an outlet port for interconnection to the second stationary pipe, said housing further including an inner case interconnected to said outer case and selectively removable from said outer case;
   a rotary stem disposed within said housing inner case and coaxially aligned with the rotating pipe for providing a first fluid communication path between the rotating pipe and the first stationary pipe, and a separate second fluid communication path between the rotating pipe and the second stationary pipe, and said rotary stem being selectively removable from said outer case by removing the inner case from said outer case without removal of said housing from the stationary pipes; and
   housing seal means interconnected to said rotary stem and disposed between said rotary stem and said housing inner case for sealing said rotary stem within said housing, and said housing seal means being selectively removable from said outer case with said rotary stem.

2. The rotary connector of claim 1 and further including:
   a rotary flange for interconnection to the rotating pipe for selectively mounting said rotary stem to the rotating pipe for transfer of torque to said rotary stem, such that said rotary stem can be selectively removed from said rotary flange without removal of said rotary flange from the rotating pipe; and
   flange seal means interconnected to said rotary stem and disposed between said rotary stem and said rotary flange for sealing said rotary stem to said rotary flange, and said flange seal means being selectively removable from said rotary flange without removal of said rotary flange from the rotating pipe.

3. The rotary connector of claim 2 wherein said flange seal means includes:
   a split ring for engaging said rotary stem and being interconnected to said rotary flange; and
   a seal ring being disposed between said rotary stem and said rotary flange.

4. The rotary connector of claim 1 wherein said housing includes:
   an outer case interconnected to the stationary pipes and an inner case interconnected to said outer case of said housing and to said housing seal means, such that inner case being selectively removable from said outer case with said rotary stem.

5. The rotary connector of claim 1 wherein said housing seal includes:
   a seal sleeve disposed adjacent said rotary stem; and
   means for preventing axial movement of said seal sleeve with respect to said rotary stem.

6. The rotary connector of claim 5 wherein said means for preventing axial movement of said seal sleeve includes a split ring engaging said rotary stem and said seal sleeve.

7. The rotary connector of claim 1 and further including:
   means for supporting said housing; and
   means mounted to said housing parallel to the central axis of said rotary stem for attaching said housing to said housing support means.

8. A rotary connector for selectively coupling a rotating pipe to a stationary inlet pipe and a stationary outlet pipe comprising;
   a housing including an outer case interconnected to the stationary inlet pipe and the stationary outlet pipe;
   said housing further including an inner case interconnected to said outer case and selectively removable from said outer case;
   an outer rotary stem disposed within said housing inner case for providing a fluid communication path between the rotating pipe and the stationary outlet pipe, said outer stem being selectively removable from said housing without removal of said housing from the stationary pipes;
   an inner rotary stem coaxially mounted to said outer rotary stem for rotation therewith, and for providing a fluid communication path between the rotating pipe and the stationary inlet pipe, said inner rotary stem being removable with said outer rotary stem from said inner case;
   housing seal means interconnected to said outer rotary stem and disposed between said outer rotary stem and said outer case, and further being disposed between said outer rotary stem and said inner case for sealing said outer rotary stem within said housing, said housing seal means being selectively removable from said housing and said outer rotary stem without removal of said outer case from the stationary pipes;

a rotary flange interconnected to the rotating pipe and for selectively mounting said outer rotary stem to the rotating pipe for transfer of torque to said outer rotary stem, and such that said outer rotary stem can be selectively removed from said rotary flange without removal of said rotary flange from the rotating pipe; and flange seal means interconnected to said outer rotary stem and disposed between said outer rotary stem and said rotary flange for sealing said outer rotary stem to said rotary flange, and said flange seal means being selectively removable from said rotary flange without removal of said rotary flange from the rotating pipe.

9. The rotary connector of claim 8 wherein said housing seal means includes:
a seal sleeve disposed adjacent said outer rotary stem and said outer case and said inner case;
means for preventing axial movement of said seal sleeve with respect to said outer rotary stem.

10. The rotary connector of claim 9 wherein said means for preventing axial movement of said seal sleeve includes:
a split ring for engaging said outer rotary stem and said seal sleeve.

11. The rotary connector of claim 10 and further including:
means for preventing rotational movement of said seal sleeve with respect to said outer rotary stem.

12. The rotary connector of claim 8 wherein said flange seal means includes:
a split ring for engaging said outer rotary stem and being interconnected to said rotary flange; and
a seal ring disposed between said outer rotary and said rotary flange.

13. The rotary connector of claim 8 and further including:
means for supporting said housing; and
means mounted to said outer case parallel to the central axis of said outer rotary stem for attaching said housing to said housing support means.

14. A rotary connector for use with a rotating combustion unit, the rotating combustion unit including coaxially disposed inner and outer rotating pipes, the rotary connector selectively coupling the rotating pipes to a stationary inlet pipe and a stationary outlet pipe comprising;
a housing including an outer case interconnected to the stationary inlet pipe and the stationary outlet pipe;
said housing further including an inner case interconnected to said outer case and selectively removable from said outer case;
an outer rotary stem disposed within said housing inner case for providing a fluid communication path between the inner rotating pipe and the stationary outlet pipe, said outer stem being selectively removable from said housing without removal of said housing from the stationary pipes;
an inner rotary stem coaxially mounted to said outer rotary stem for rotation therewith, and being connected to the inner rotating pipe for providing a fluid communication path between the outer rotating pipe and the stationary inlet pipe, said inner rotary stem being removable with said outer rotary stem;
housing seal means interconnected to said outer rotary stem and disposed between said outer rotary stem and said outer case, and further being disposed between said outer rotary stem and said inner case for sealing said outer rotary stem within said housing, said housing seal means being selectively removable from said housing with said outer rotary stem without removal of said outer case from the stationary pipes;

a rotary flange interconnected to the rotating pipe and for selectively mounting said outer rotary stem to the rotating pipe for transfer of torque to said outer rotary stem, and such that said outer rotary stem can be selectively removed from said rotary flange without removal of said rotary flange from the rotating pipe; and flange seal means interconnected to said outer rotary stem and disposed between said outer rotary stem and said rotary flange for sealing said outer rotary stem to said rotary flange, and said flange seal means being selectively removable from said rotary flange without removal of said rotary flange from the rotating pipe.

15. The rotary connector of claim 14 wherein said housing seal means includes:
a seal sleeve disposed adjacent said outer rotary stem and said outer case and said inner case; and
means for preventing axial movement of said seal sleeve with respect to said outer rotary stem.

16. The rotary connector of claim 15 wherein said means for preventing axial movement of said seal sleeve includes:
a split ring for engaging said outer rotary stem and said seal sleeve.

17. The rotary connector of claim 14 and further including:
means for preventing rotational movement of said seal sleeve with respect to said outer rotary stem.

18. The rotary connector of claim 14 wherein said flange seal means includes:
a split ring for engaging said outer rotary stem and being interconnected to said rotary flange; and
a seal ring disposed between said outer rotary and said rotary flange.

19. The rotary connector of claim 14 and further including:
means for supporting said housing; and
means mounted to said outer case parallel to the central axis of said outer rotary stem for attaching said housing to said housing support means.

20. A rotary connector for selectively coupling a rotating pipe to a stationary pipe comprising;
a housing including an outer case for interconnection to the stationary pipe, said housing further including an inner case interconnected to said outer case and selectively removable from said outer case;
a rotary stem including an outer rotary stem disposed within said housing inner case for providing a fluid communication path between the rotating pipe and the stationary pipe, and said outer rotary stem being selectively removable from said outer case by removing the inner case from said outer case without removal of said outer case from the stationary pipe;
said rotary stem including an inner rotary stem coaxially mounted to said outer rotary stem for rotation therewith and being removable with said outer rotary stem from said housing inner case;
housing seal means interconnected to said rotary stem and disposed between said rotary stem and said housing inner case for sealing said rotary stem within said housing, and said housing seal means being selectively removable from said outer case with said rotary stem;

a rotary flange for interconnection to the rotating pipe for selectively mounting said outer rotary stem to the rotating pipe for transfer of torque to said outer rotary stem, and such that said outer rotary stem can be selectively removed from said rotary flange without removal of said rotary flange from the rotating pipe; and flange seal means interconnected to said outer rotary stem and disposed between said outer rotary stem and said rotary flange for sealing said outer rotary stem to said rotary flange, and said flange seal means being selectively removable from said rotary flange without removal of said rotary flange from the rotating pipe.

21. The rotary connector of claim 20 wherein said flange seal means includes:

a split ring for engaging said rotary stem and being interconnected to said rotary flange; and a seal ring being disposed between said rotary stem and said rotary flange.

22. A rotary connector for selectively coupling a rotating pipe to first and second stationary pipes comprising:

a housing including an outer case having an inlet port for interconnection to the first stationary pipe and an outlet port for interconnection to the second stationary pipe, said housing further including an inner case interconnected to said outer case and selectively removable from said outer case;

a rotary stem disposed within said housing inner case for providing fluid communication paths between the rotating pipe and the stationary pipes, and said rotary stem being selectively removable from said housing without removal of said housing from the stationary pipes;

said rotary stem includes a first rotary stem and a coaxially mounted second rotary stem, such that a first fluid communication path is established from the rotating pipe to the second stationary pipe through said first and said second rotary stems, and a separate second fluid communication path is established from the first stationary pipe to the rotating pipe through said second rotary stem; and housing seal means interconnected to said rotary stem and disposed between said rotary stem and said housing inner case for sealing said rotary stem within said housing, and said housing seal mans being selectively removable from said outer case with said rotary stem.

23. A rotary connector for selectively coupling a rotating pipe to a stationary pipe comprising;

a housing including an outer case for interconnection to the stationary pipe, said housing further including an inner case interconnected to said outer case and selectively removable from said outer case;

a rotary stem disposed within said housing inner case for providing a fluid communication path between the rotating pipe and the stationary pipe, and said rotary stem being selectively removable from said outer case by removing the inner case from said outer case without removal of said outer case from the stationary pipe;

housing seal means interconnected to said rotary stem and disposed between said rotary stem and said housing inner case for sealing said rotary stem within said housing, and said housing seal means being selectively removable from said outer case with said rotary stem;

said housing seal means including a seal sleeve disposed adjacent said rotary stem; and a split ring engaging said rotary stem and said seal sleeve for preventing axial movement of said seal sleeve with respect to said rotary stem.

* * * * *